United States Patent
Montambault et al.

(10) Patent No.: US 6,494,141 B2
(45) Date of Patent: Dec. 17, 2002

(54) REMOTELY OPERATED VEHICLE FOR INSPECTION AND INTERVENTION OF A LIVE LINE

(75) Inventors: Serge Montambault, Sainte-Julie (CA); Jacques Cote, Montréal (CA)

(73) Assignee: Hydro-Quebec, Montreal (CA)

( * ) Notice: Subject to any disclaimer, the term of this patent is extended or adjusted under 35 U.S.C. 154(b) by 0 days.

(21) Appl. No.: 09/789,964

(22) Filed: Feb. 22, 2001

(65) Prior Publication Data
US 2001/0015149 A1 Aug. 23, 2001

(30) Foreign Application Priority Data
Feb. 22, 2000 (CA) ............................................. 2299662

(51) Int. Cl.$^7$ ................................................. H02G 1/00
(52) U.S. Cl. .......................... 104/112; 104/229; 105/30
(58) Field of Search ................................. 104/112, 116, 104/229, 230, 236, 233, 235; 105/30, 32, 33

(56) References Cited

U.S. PATENT DOCUMENTS

| | | | | |
|---|---|---|---|---|
| 3,518,947 A | * | 7/1970 | Borst | 105/30 |
| 4,044,688 A | * | 8/1977 | Kita | 104/118 |
| 4,185,562 A | * | 1/1980 | Hatori et al. | 104/110 |
| 4,227,304 A | * | 10/1980 | Okamura | 15/256.6 |
| 4,386,759 A | | 6/1983 | Grover et al. | 254/134.5 |
| 4,492,168 A | * | 1/1985 | Cellai | 105/153 |
| 4,904,996 A | | 2/1990 | Fernandes | 340/870.07 |
| 5,901,651 A | * | 5/1999 | Boyd | 104/112 |
| 6,199,829 B1 | * | 3/2001 | Brown et al. | 254/134.5 |
| 6,205,929 B1 | * | 3/2001 | Van Dyke et al. | 105/150 |

FOREIGN PATENT DOCUMENTS

| | | |
|---|---|---|
| DE | 19616853 | 6/1997 |
| JP | 64-81613 | 3/1989 |
| JP | 9322344 | 12/1997 |
| WO | 94/18046 | 8/1994 |
| WO | 96/36975 | 11/1996 |

* cited by examiner

*Primary Examiner*—S. Joseph Morano
*Assistant Examiner*—Frantz F. Jules
(74) *Attorney, Agent, or Firm*—Foley & Lardner

(57) ABSTRACT

A vehicle for use on a live line. The vehicle is provided with three coplanar traction wheels mounted on a frame and spaced along a first longitudinal axis parallel to the live line and above therefrom. The vehicle is also provided with two movable coplanar pressure wheels mounted on the frame and spaced along a second longitudinal axis parallel to the line and below therefrom. The vehicle has a driving motor mounted on the frame, for driving the traction wheels. The motor has a source of energy, such as batteries. The vehicle has a pressure mechanism mounted on the frame and coupled to the pressure wheels, for maintaining the line squeezed between the traction wheels and the pressure wheels. The vehicle has a control mechanism coupled to the motor for controlling the motor. Thereby, in use, the vehicle is moved along the line. The vehicle can also be provided with a de-icing tool. The de-icing tool has a collar with two parts opening and closing around the line. The collar supports several blades concentrically spaced apart from each other and forming an open cone in a forward moving direction of the vehicle.

19 Claims, 16 Drawing Sheets

REMOTELY OPERATED VEHICLE FOR INSPECTION AND INTERVENTION OF A LIVE LINE

FIELD OF THE INVENTION

The present invention relates to an improvement to small vehicles known as remotely operated vehicles (ROVS) which move along a conductor of a power line or an overhead earth wire.

The present invention also relates to a de-icing tool which is mounted on a remotely operated vehicle.

BACKGROUND

ROVs are known devices which are used to take measurements of electric, physical and/or environmental parameters and to check certain conditions associated with the power lines mounted between pylons.

The following documents describe known ROVs: U.S. Pat. No. 4,904,996 (FERNANDES); U.S. Pat. No. 5,901,651 (BOYD); and PCT patent application WO 94/18046 (SCOTT).

The main problem associated with known ROVs is their difficulty to generate a traction force (or pulling force) sufficiently strong for moving along a power line. Typical power lines can be made out of steel or aluminum and can have various diameters. In some cases, the line can be wet and, in other cases, it can even be covered with ice residues. The problem of traction arises particularly from the choice of materials of which are made up the wheels.

A known ROV has a weight of approximately 110 lb and a measured pulling force of 75 lb. This ROV has only two traction wheels of simplistic form. It measures about 25 in.×10 in.×14 in. The size of this ROV is somewhat large, and consequently cumbersome for handling and for using on live lines. Furthermore, this ROV is not designed for moving along a live line, which can be wet or covered with ice residues.

De-icing tools for cables are described in the following documents: U.S. Pat. No. 4,227,304 (OKAMURA) and JP-1081613 (MATSUMOTO). These de-icing tools are not adapted for being mounted on an ROV.

SUMMARY

A first object of the present invention is to provide an ROV having a traction force sufficient for operating on a live line, which is wet or covered with ice residues.

A second object of the present invention is to provide an ROV which is smaller than most known ROVs, which is easier to handle, and which facilitates the operations of cleaning, de-icing and inspection of power lines.

A third object of the present invention is to provide an ROV which can be move along a live line and which can be easily be installed thereon.

A fourth object of the present invention is to provide an ROV which can be adapted to fit different conductors diameters, and can cross conductor joints of live lines.

According to the present invention, there is provided a vehicle for use on a live line, comprising:

three coplanar traction wheels mounted on a frame and spaced along a first longitudinal axis parallel to the live line and above therefrom;

two movable coplanar pressure wheels mounted on the frame and spaced along a second longitudinal axis parallel to the line and below therefrom;

a driving motor mounted on the frame, for driving the traction wheels, the motor having a source of energy;

pressure means mounted on the frame and coupled to the pressure wheels, for maintaining the line squeezed between the traction wheels and the pressure wheels; and control means coupled to the motor for controlling the motor; and thereby in use, the vehicle is moved along the line.

Another object of the present invention is to provide a de-icing tool for breaking the ice which has accumulated on a live line or on overhead earth wire.

According to another aspect of the present invention, there is also provided a de-icing tool mounted on a vehicle for use in a live line, comprising:

a collar having two parts opening and closing around the line, the collar supporting blades concentrically spaced apart from each other and forming an open cone in a forward moving direction of the vehicle.

BRIEF DESCRIPTION OF THE DRAWINGS

The invention as well as its numerous advantages will be better understood by the following non-restrictive description of preferred embodiments made in reference to the appending drawings in which.

DETAILED DESCRIPTION OF THE INVENTION

Figure 1:
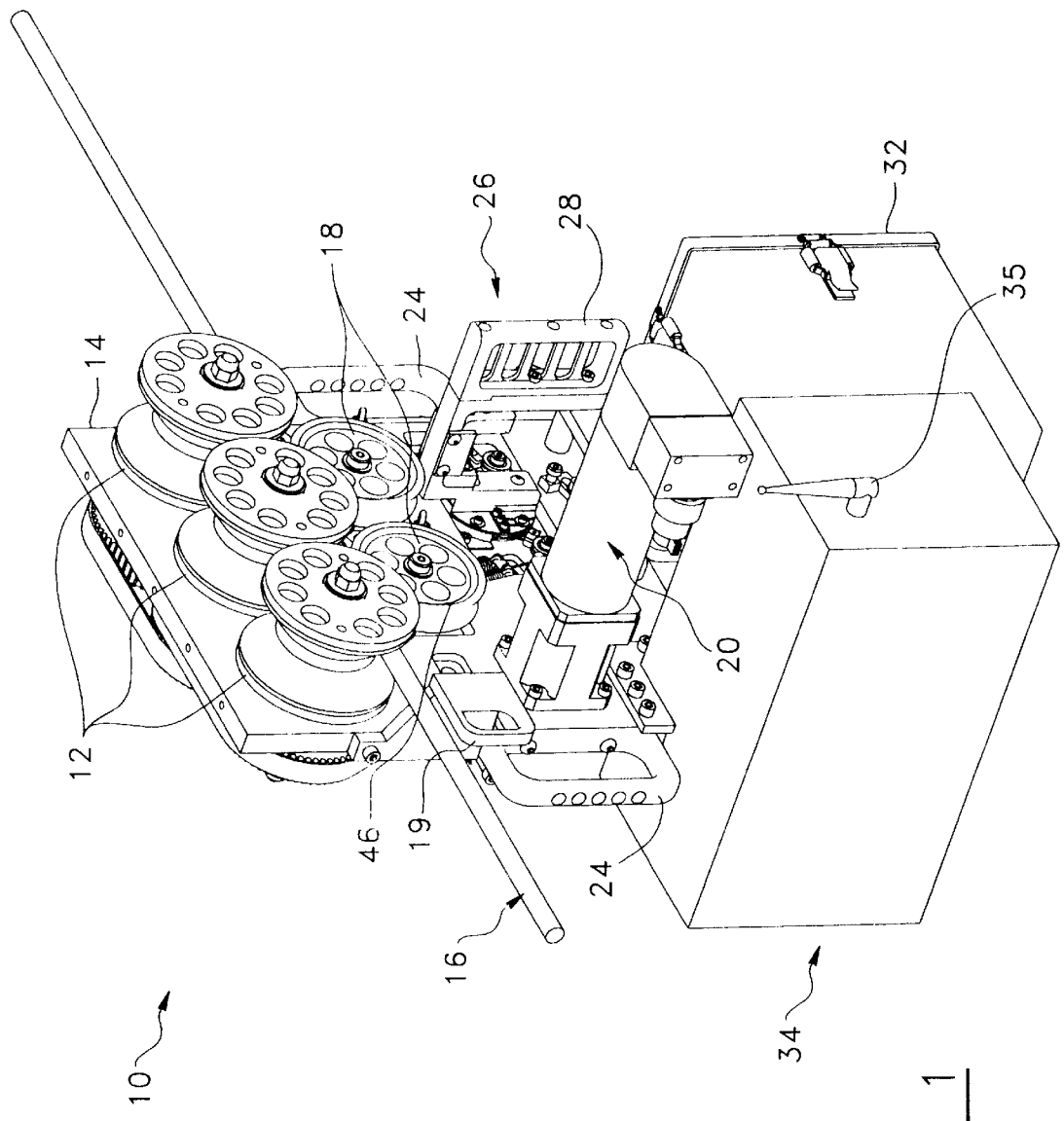
FIG. 1 is perspective view of a remotely operated vehicle according to the present invention.

As shown on FIG. 1, the remotely operated vehicle 10, according to a preferred embodiment of the invention, is mounted on a live line 16. The vehicle 10 has three coplanar traction wheels 12 mounted on the same side of a frame 14. The traction wheels 12 are spaced along a first longitudinal axis, which is parallel to the live line 16 and above therefrom. The vehicle 10 also has two coplanar pressure wheels 18 which are spaced along a second longitudinal axis, which is parallel to the live line 16 and below therefrom. The pressure wheels 18 are mounted on the same side of the frame 14 than the traction wheels 12 and are movable with respect to the frame 14.

Preferably, the pressure wheels 18 are centred between the traction wheels 12 and have a smaller radius than the traction wheels 12.

Other configurations for the alignment of the wheels may be achieved and the number of the wheels used can be modified, but the best experimental results are achieved by the present embodiment.

In order for the vehicle 10 to fit different conductors diameters, and to exert pressure on a cable 16, the traction wheels 12 are fixed on the frame 14, while the pressure wheels 18 are adapted to move. Of course, other configurations can be achieved to obtain the same result, for example, by inverting the position of the traction and pressure wheels.

Figure 2:
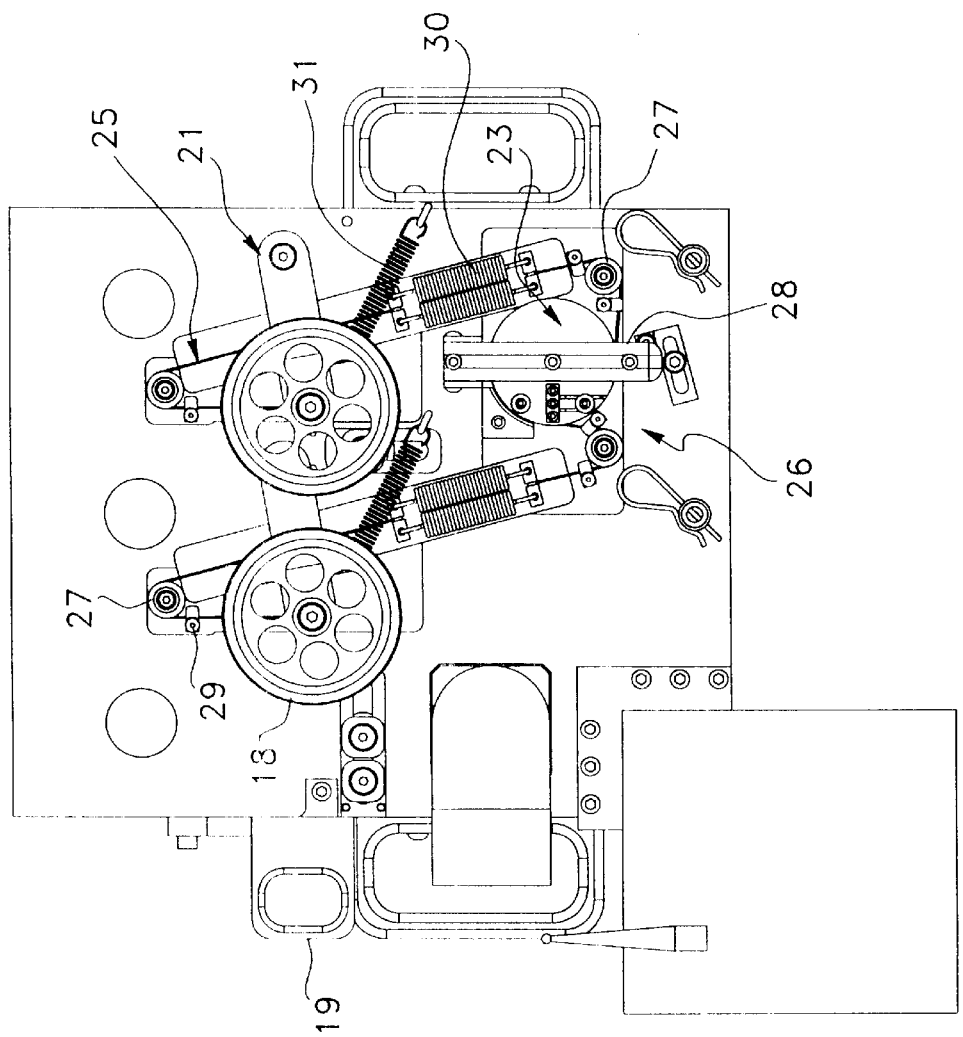
FIG. 2 is a side view of the remotely operated vehicle with the traction wheels removed.

As shown on FIG. 2, each pressure wheel 18 is preferably mounted onto an arm 21 that is pivotally mounted on the frame 14. In such a way, the pressure wheels 18 can move with respect to the frame 14 along an arc of a circle.

A pressure mechanism 26 is also mounted on the frame 14 and is coupled to the pressure wheels 18 to maintain the line 16 squeezed between the traction wheels 12 and the pressure wheels 18.

The pressure mechanism 26 is preferably a lever-trigger system. The lever-trigger system has a lever 28 that is manually pivoted between two blocked positions just like a trigger. The lever 28 is connected to a drum 23, which in a first position of the lever 28 brings the pressure wheels 18 closer to the traction wheels 12, while in a second position of the lever 28, distances the pressure wheels 18 from the traction wheels 12. A pair of steel cables 25, one for each pressure wheel 18, are wrapped around the drum 23 and each of the cables 25 has an end fixedly attached thereto. Each of the cables 25 is also wrapped around pulleys 27 that redirect each of the cables 25 toward each of the arms 21 holding the pressure wheels 18. The cables 25 are also guided by means of guides 29.

Preferably, each pressure wheel 18 has an independent suspension that takes the form of tension springs 30 that are connected in series on a section of each of the cables 25. Also, return springs 31 are connected between the arm 21 of each pressure wheel 18 and the frame 14. This allows the vehicle 10 to move more easily across obstacles that can be encountered on the line 16, such as junction conductors.

Of course, other pressure mechanisms than those illustrated in the figures can be used in order to press the pressure wheels 18 onto the traction wheels 12 and to adjust the pressure force accordingly. These means may be a hydraulic or gas cylinder piston system or a motorized lever-trigger system for example. It is not necessary that the pressure mechanism 26 be manually controlled, as it can replaced by an electric control mechanism that can be remotely operated.

Figure 3:
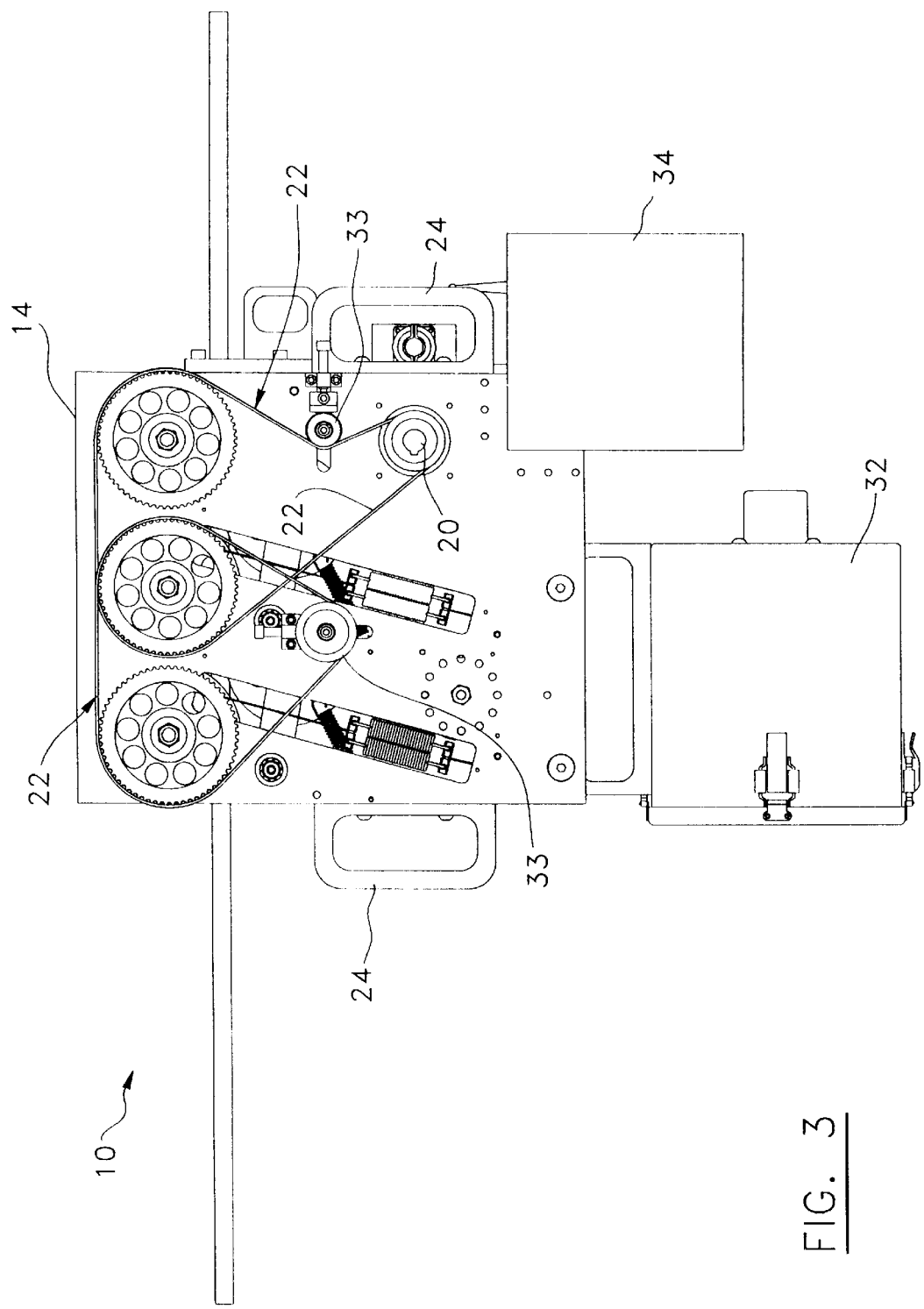
FIG. 3 is a back view of the remotely operated vehicle according to the present invention.

The vehicle 10 has a traction motor 20 for driving the traction wheels 12 by means of belts 22, which are mounted on the backside of the traction wheels 12, and on the other side of the frame 14 (see FIG. 3). Tension mechanisms 33 are preferably used to adjust the tension of the belts 22.

A control mechanism 34 is linked to the motor 20 in order to control it. This control mechanism 34 is used to adjust the speed of the vehicle 10.

Preferably, the motor 20 is an electric motor powered by batteries mounted on a lower part of the frame 14 of the vehicle 10 inside a housing 32. The batteries can be rechargeable nickel metal hydride batteries. The batteries provide the necessary autonomy for the operations of cleaning, de-icing and surveillance of the live lines 16 for which the vehicle 10 has been designed. The motor 20 can also be a gas or other type of motor, and could also be powered with an electric cable.

Preferably, the vehicle 10 also has the necessary electronics needed for the desired operations and is provided with a remote control system that controls the motor 20 and/or the pressure mechanism 26. The remote control system is mounted in a housing 34 called a Faraday cage. The remote control system is linked to an antenna 35 for receiving the control signals from the operators. Because the vehicle has to move along a single conductor 16 having a voltage of about 315 kV, the remote control system and all electronic components must be robust and able to withstand the surrounding magnetic and electric fields. The housing 34 and the disposition of the cables and printed circuits in the housing minimize any electromagnetic interference.

Preferably, the radio frequency for the remote control technology is based on the concept of frequency jumps (frequency bands between 902 and 928 MHz). The spread of the spectrum reduces the interference of the live line. Tests have shown that the reach of the signal is of 1 km around the live line because of the interference. Such a technology does not generally require special governmental permits due to the frequency band used and the weakness of the signal.

Of course, it is not necessary to use a wireless remote control system, even though it can be more convenient. A cable linking the control mechanism 34 to a ground controller can also be used as an alternative.

Preferably, the vehicle 10 is provided with a pair of handles 24 on opposite sides of the frame 14 so that an operator can grip and handle the vehicle 10. A grip 19 is also provided on the front part of the vehicle 10 in order to pull the vehicle with a rope, if necessary.

The vehicle 10 can also be equipped with a camera having pan and tilt functions, a microphone, an infrared camera, instruments for measuring the resistivity of junction conductors, of currents and voltages, and the temperature around the line 16. It can also be provided with other devices having multiple functions.

Figure 4:
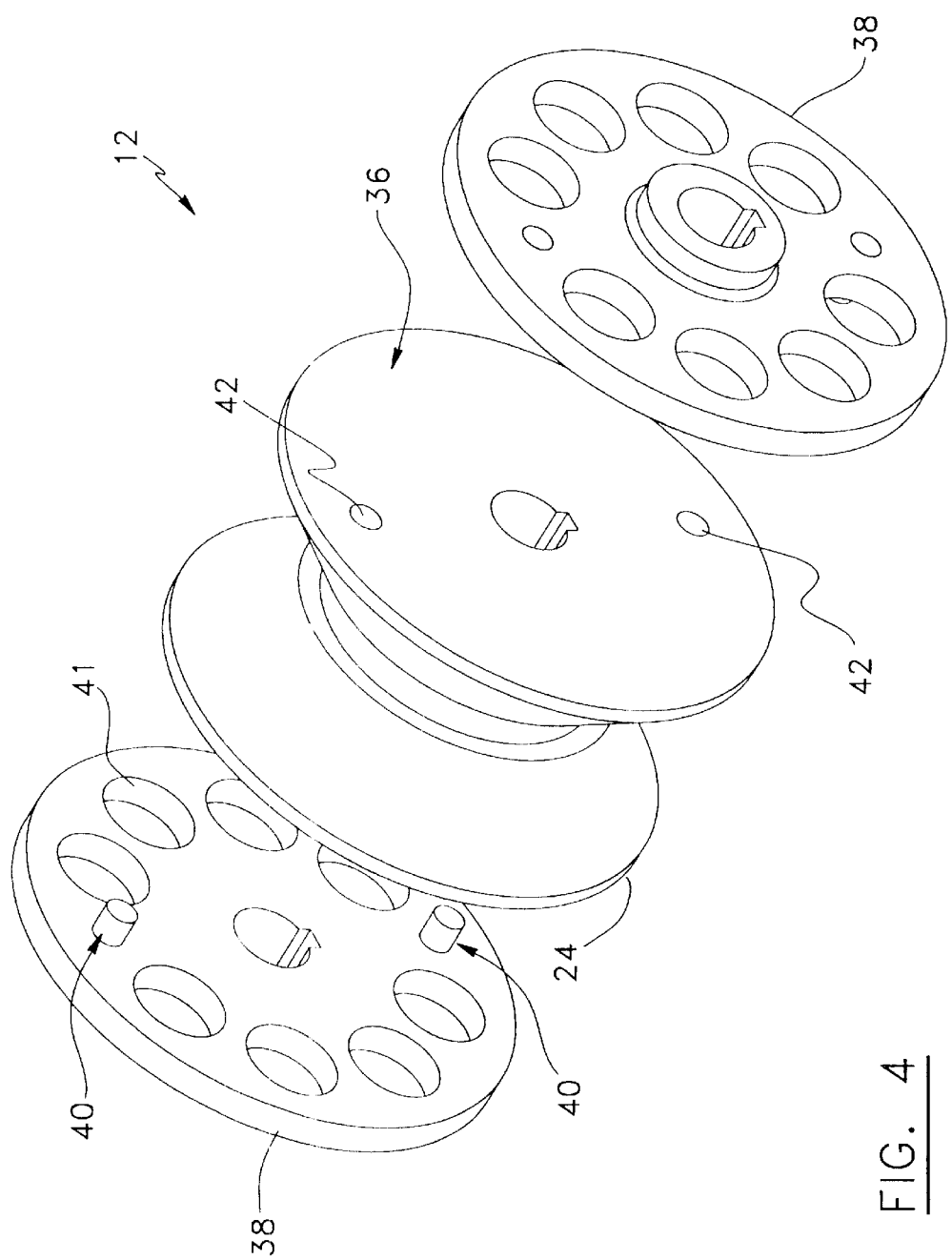
FIG. 4 is a perspective exploded view of a traction wheel of the remotely operated vehicle.
Figure 6:
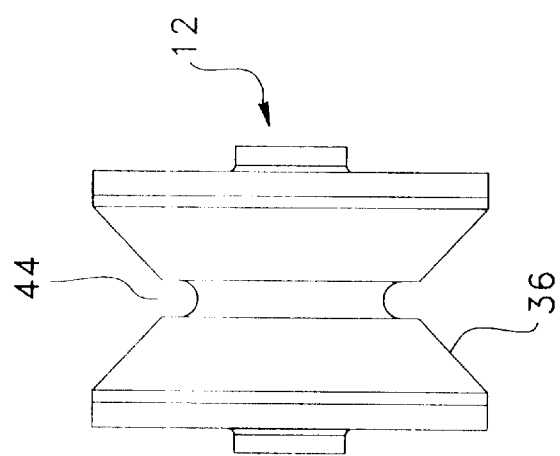
FIG. 6 is a side view of the traction wheel shown in FIG. 5 when assembled.
Figure 5:
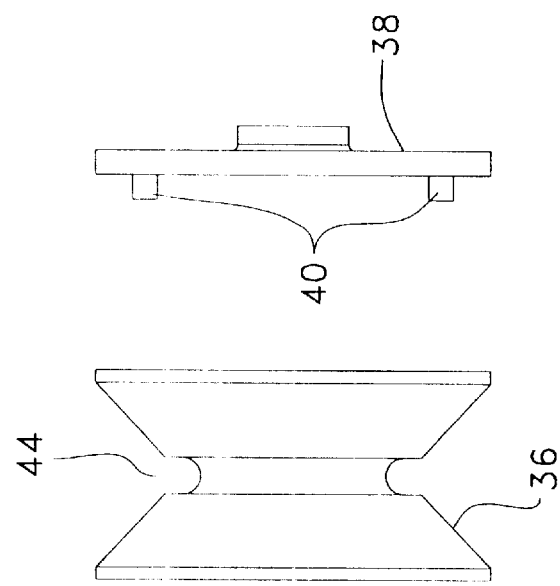
FIG. 5 is a side view of the traction wheel shown on FIG. 4.

FIGS. 4, 5 and 6 show in greater detail one of the traction wheels 12. The wheel 12 has a core 36 made of a material capable of transferring a maximum traction force to the vehicle 10. This material is preferably made of neoprene™ or any thermoplastic synthetic rubber. The core 36 may also be made of polyurethane. Additives of an abrasive type can also be added to the polyurethane, such as silicates or metals. The core 36 can also be made of natural rubber. The core 36 is squeezed between two structural plates 38 that can be made with other materials, but are preferably made of a more rigid polyurethane than that of the core 36. Openings 41 are provided on the plates 38 for decreasing the weight of the vehicle 10. Positioning pins 40 on one side of the structural plates 38 allow these to be mounted on the core 36 through corresponding openings 42. The core 36 has a groove 44 for receiving the line 16 and to guide it. The groove 44 or a portion thereof is narrower than the line 16 so as to maximize the contact surface between the two, and a greater lateral pressure force is thus exerted on the line 16.

The pressure wheels 18 are preferably made of metal but other materials, such as the ones used for the traction wheels 12, can also be used. The pressure wheels 18 also have a central groove 46 for receiving the line 16 and to guide it (see FIG. 1). All the wheels 12, 18 are preferably provided with openings so as to decrease the total weight of the vehicle 10.

Because the vehicle has to be handled by operators on top of pylons, it has to be light and very robust. Experimental tests made on a vehicle weighing 45 lb (21 kg), that is 28 lb (13 kg) for the vehicle 10 itself and 17 lb (8 kg) for the battery with an autonomy of 45 minutes (3 km at a speed of 1.2 m/s). Twelve batteries of 9.6 V were connected in series. Nickel metal hydride batteries provide good performances, even at low temperatures (−10 C.). Good traction results were obtained and the vehicle was able to climb a cable inclined at 52°. The dimensions of the vehicle were of 16 in×14 in×16 in.

The test for measuring the traction force consists of using a load cell mounted on the vehicle 10. The load is increased until the wheels 12, 18 start to slip. Tests have shown that traction force can be increased up to 225 lb in ideal conditions. In icy and watery conditions the traction force was measured to range from 125 to 150 lb.

The vehicle was able to adapt to different diameters of conductors and was able to move across conductor junctions present on live lines. The de-icing operations were achieved at a temperature of −10 degrees Celsius.

One of the major improvements of the present invention resides in the materials used in the traction wheels 12. The vehicle 10 has the advantage of generating a traction force of at most 225 lb. This is good enough for the vehicle to be used on a humid cable or even on a cable covered with ice residues.

The vehicle 10 is very useful for de-icing, cleaning and maintenance operations, for surveillance of electric conductors and/or surveillance of other conditions, for example weather or environmental conditions. The vehicle 10 can be used in icy conditions while at the same time being provided with the necessary de-icing tools.

Furthermore, the vehicle 10 is light, easy to handle during its installation and can function even during difficult weather conditions. The vehicle 10 is robust to electric and magnetic fields of a 315 kV live line and can be remotely controlled from a distance.

Figure 7:
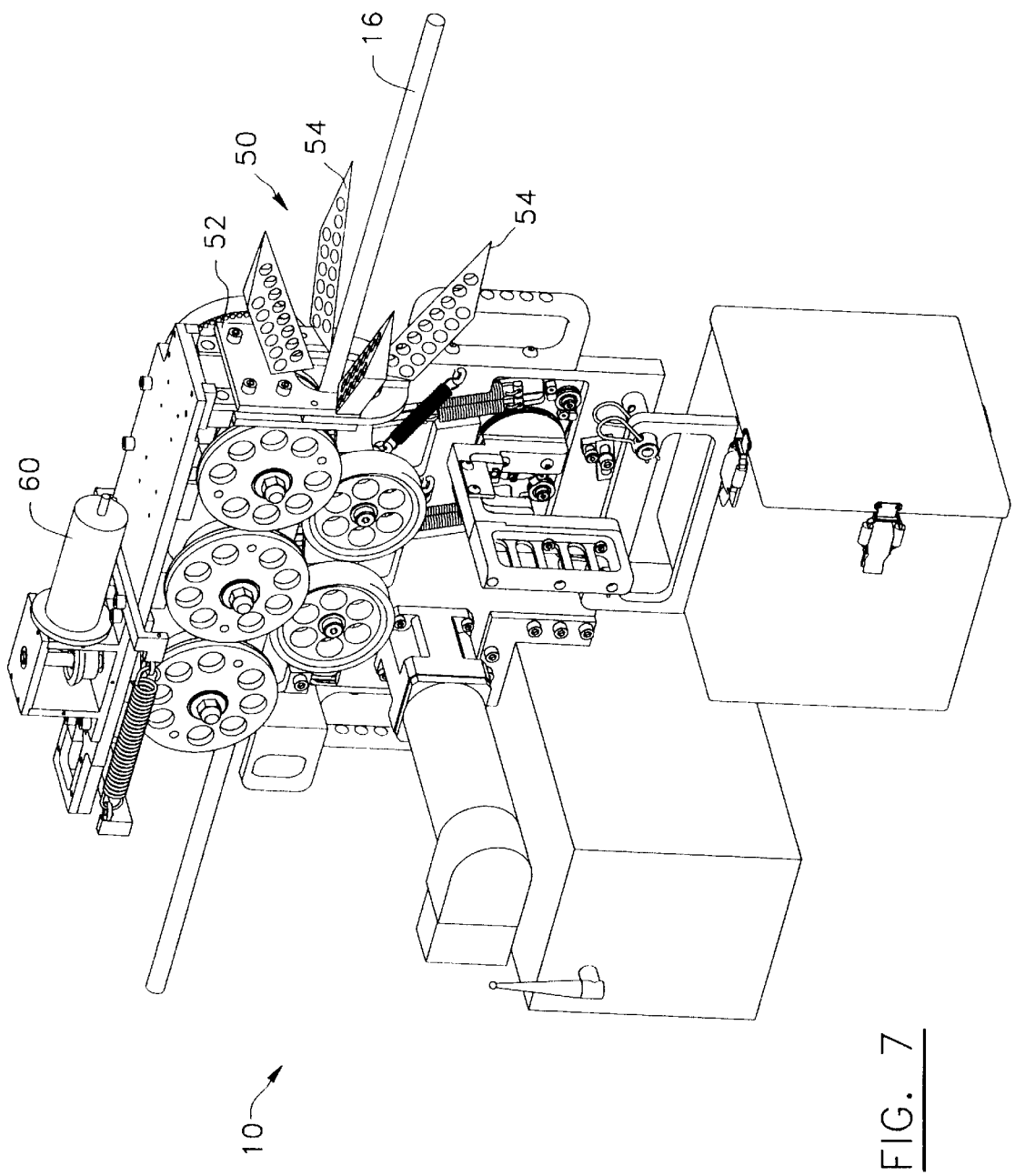
FIG. 7 is a perspective view of a de-icing tool mounted on the remotely operated vehicle according to the present invention.

As shown in FIG. 7, a de-icing tool 50 can be mounted on the vehicle 10. The de-icing tool 50 has a collar 52 having two parts adapted to be opened and closed around a live line 16. The collar 52 supports blades 54 concentrically spaced apart from each other and forming an open cone in a forward moving direction of the vehicle 10.

Figure 15:
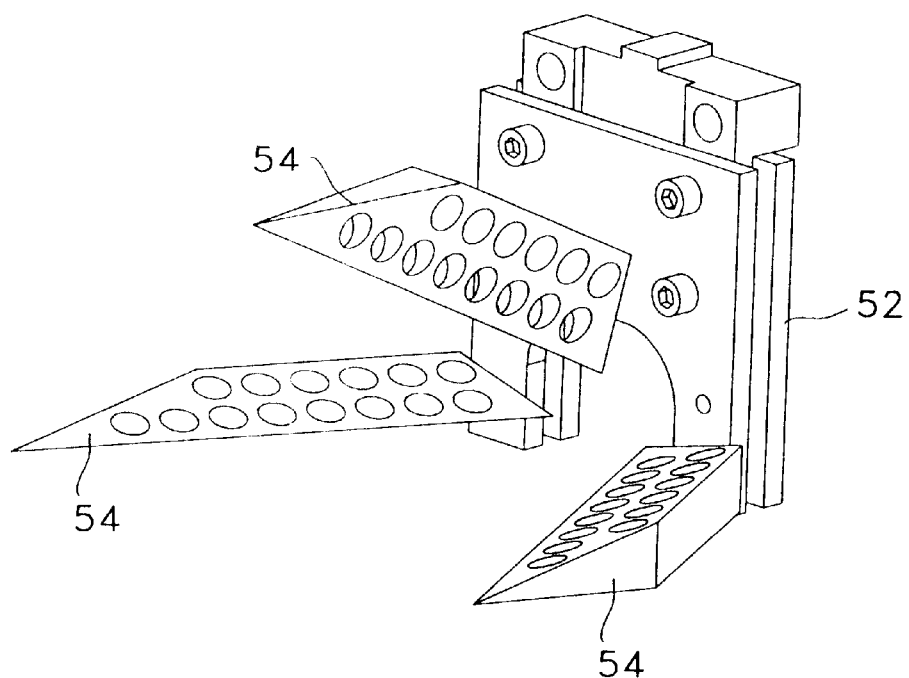
FIG. 15 is a perspective view of an upper part of a collar forming the de-icing tool.
Figure 16:
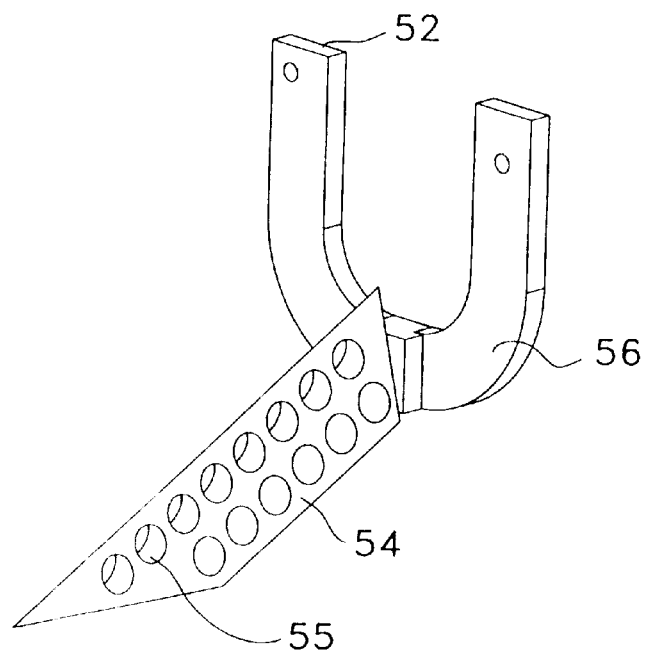
FIG. 16 is a perspective view of a lower part of the collar forming the de-icing tool.
Figure 17:
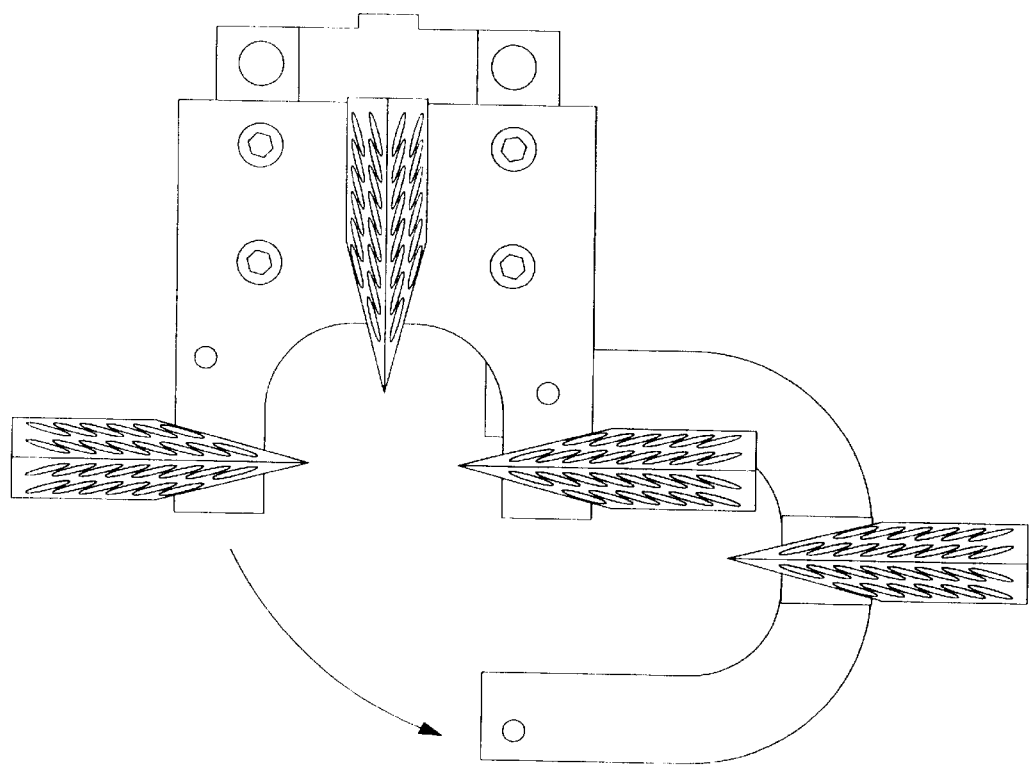
FIG. 17 is a front view of the collar forming the de-icing tool, with the collar being in an open position.
Figure 18:
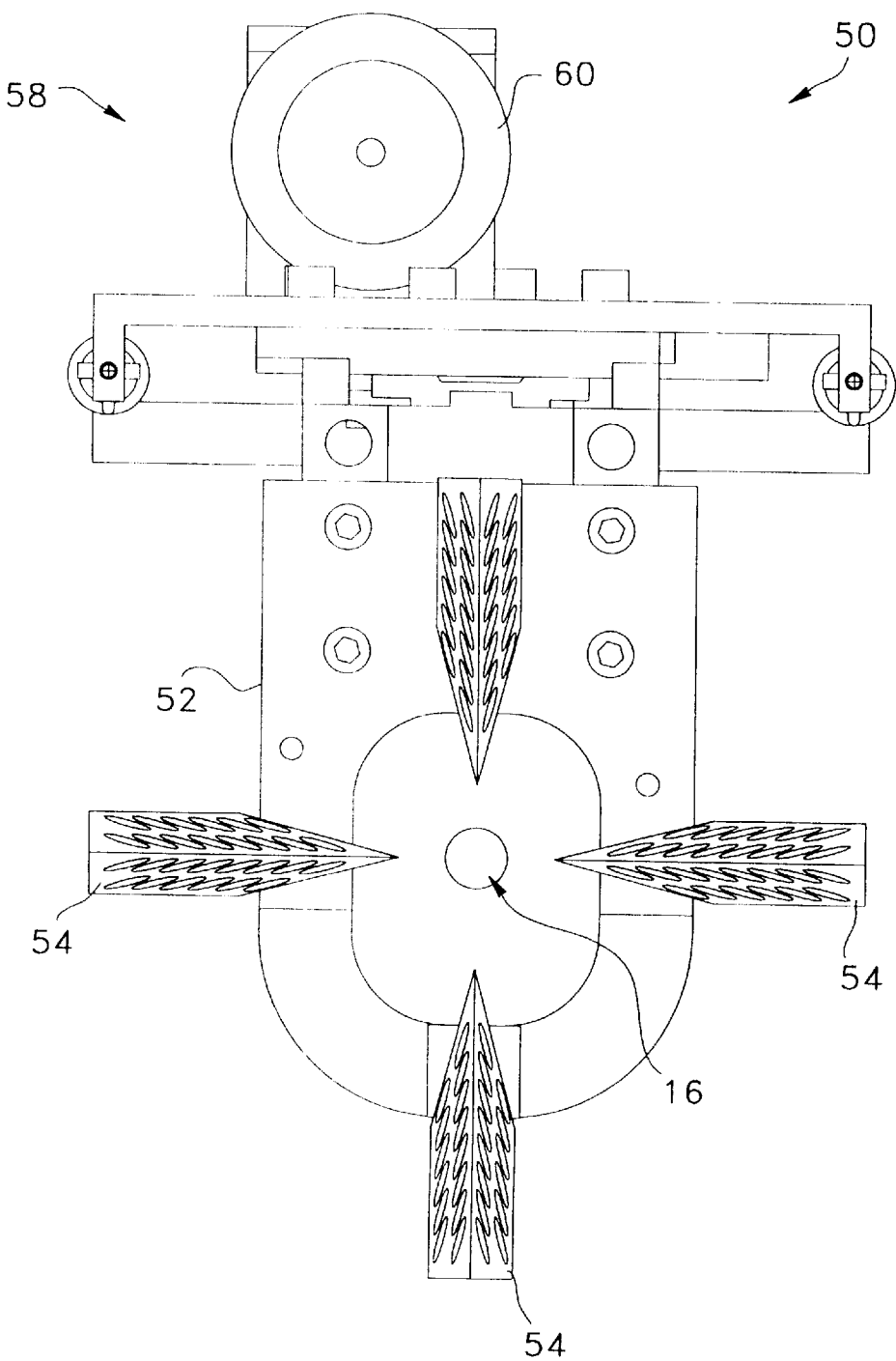
FIG. 18 is a front view of the de-icing tool mounted on the chariot, with the collar being in a closed position.

As shown in FIGS. 15 to 17, at least one of the blades 54 is preferably fixed on a pivotally mounted plate 56 forming an integral part of the collar 52. This allows the collar 52 to be easily mounted around the live line 16 (as shown in FIG. 18). The collar 52 has preferably three or four blades that are provided with holes 55 so as to decrease the weight of the vehicle 10.

Experimental tests have shown that the de-icing tool 50 mounted on the vehicle can break the ice which has accumulated on a live line while the vehicle 10 is moving forward.

Figure 8:
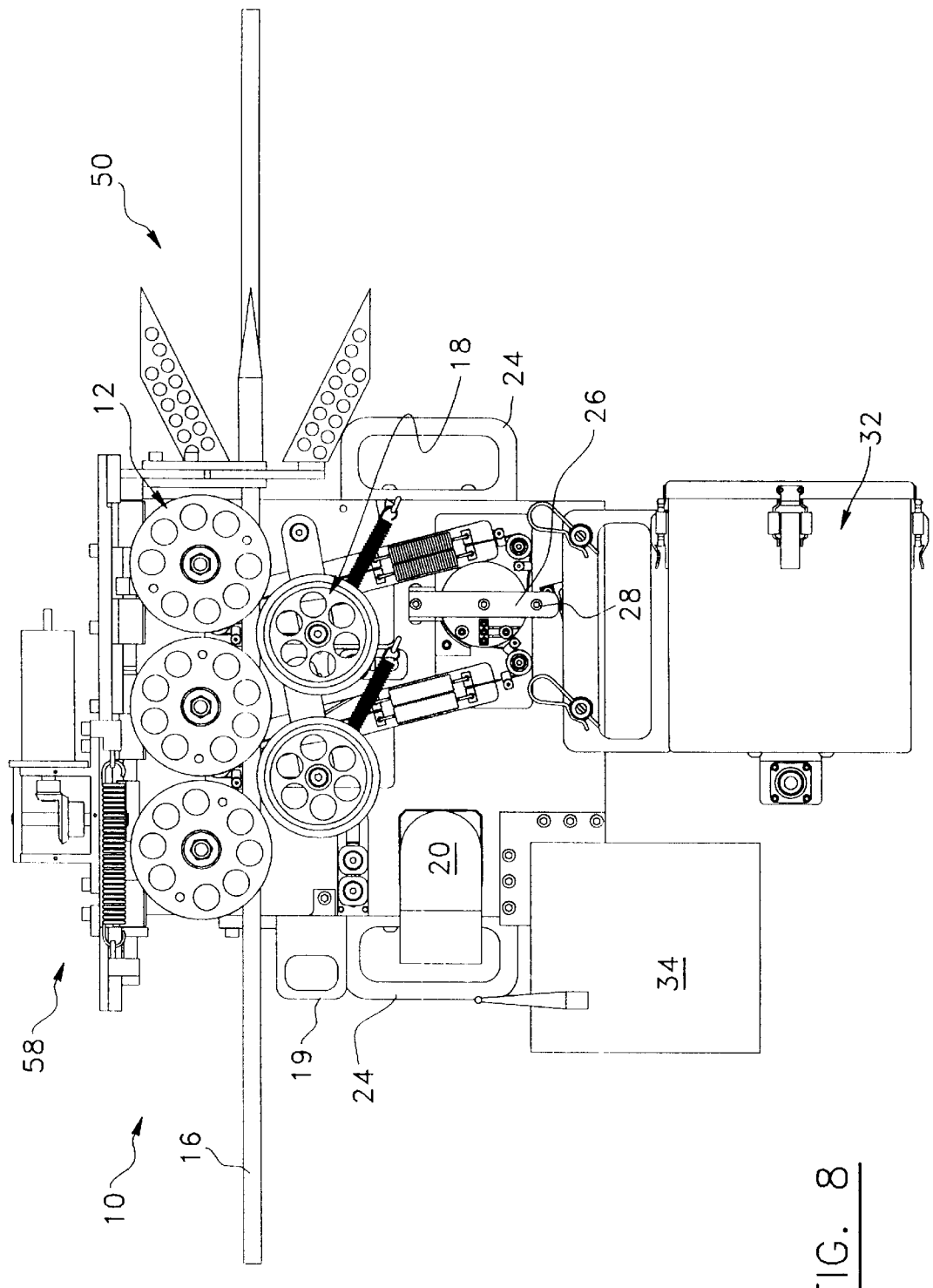
FIG. 8 is a side view of the de-icing tool mounted on the remotely operated vehicle according to the present invention.
Figure 9:
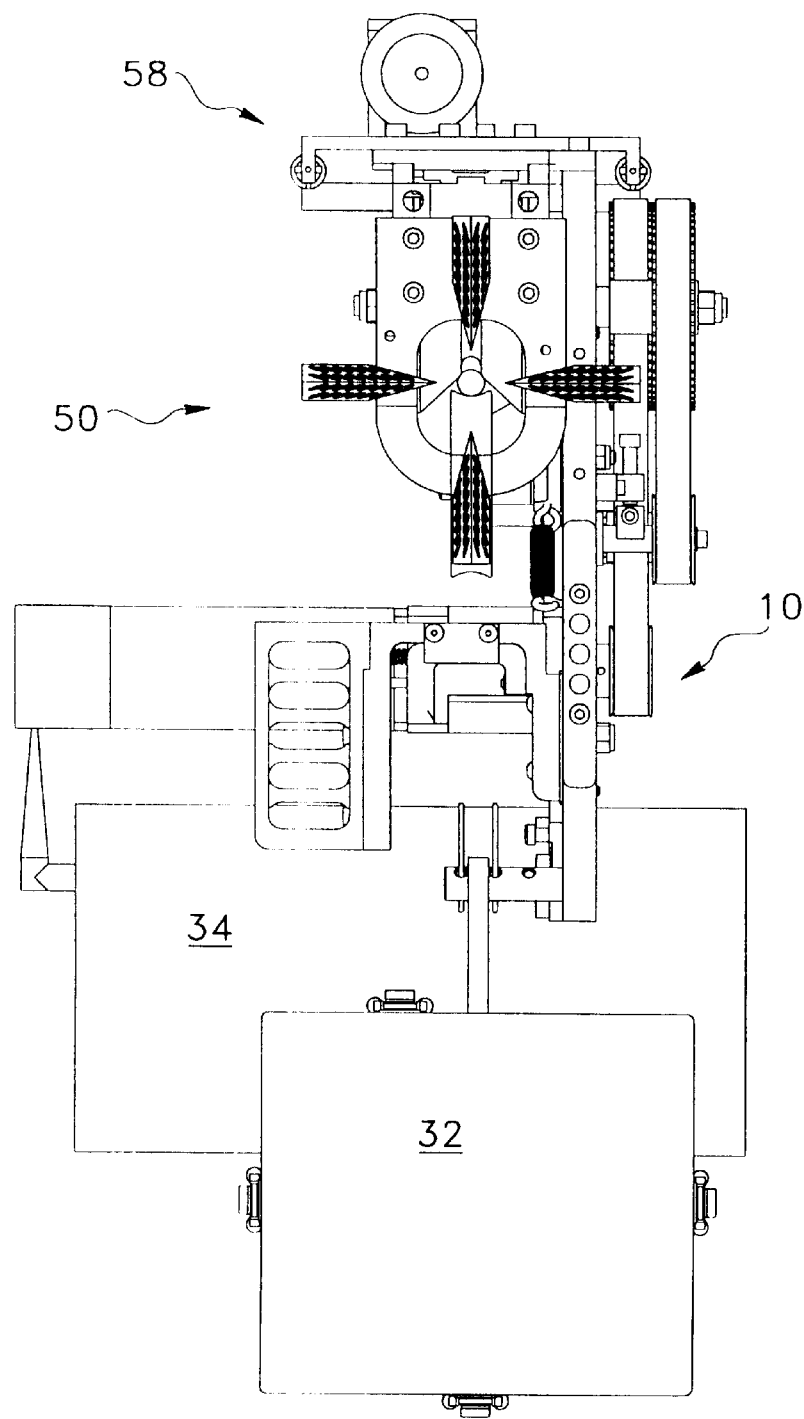
FIG. 9 is a front view of the de-icing tool mounted on the remotely operated vehicle according to the present invention.
Figure 10:
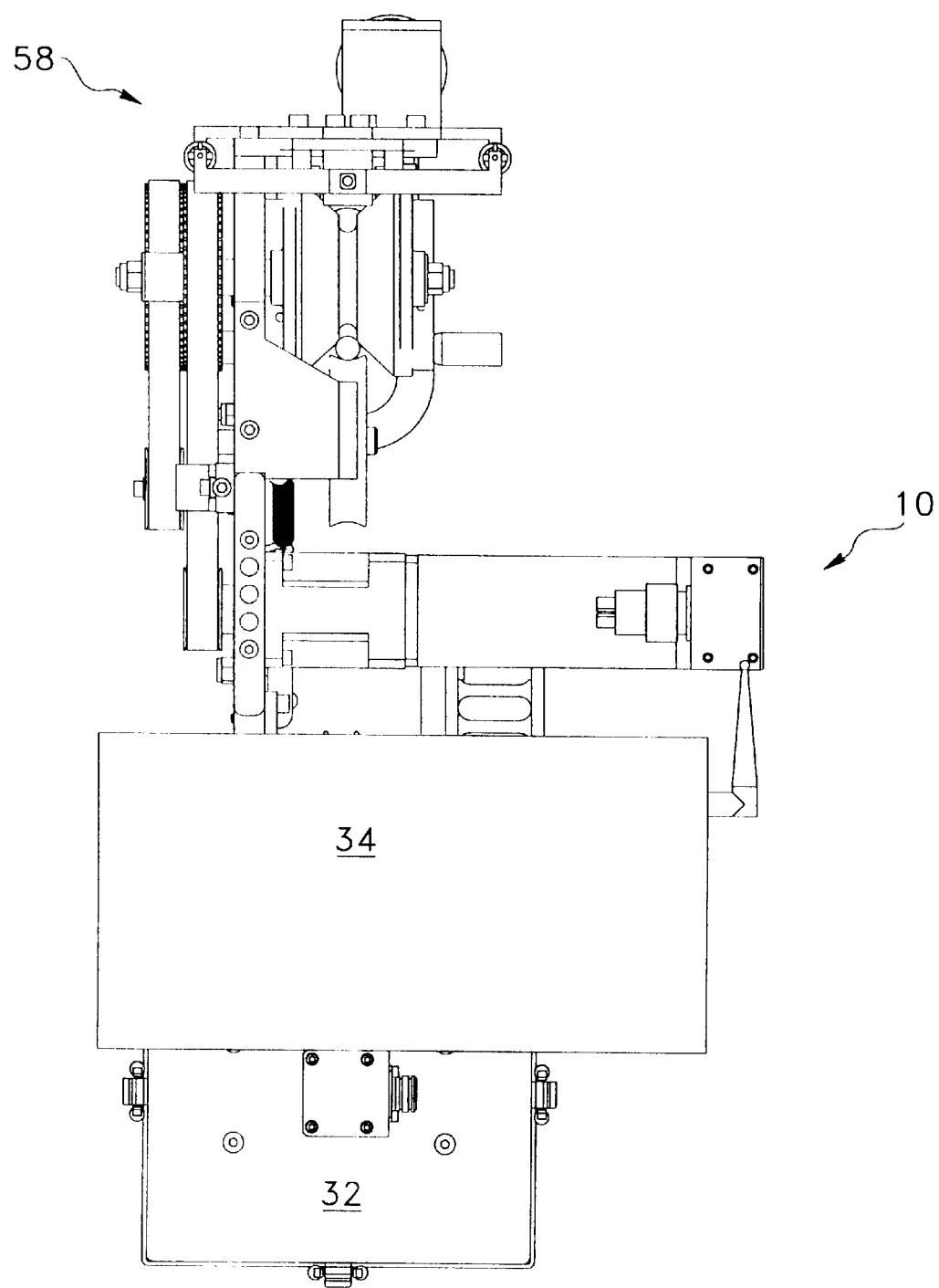
FIG. 10 is a back view of the de-icing tool mounted on the remotely operated vehicle according to the present invention.
Figure 11:
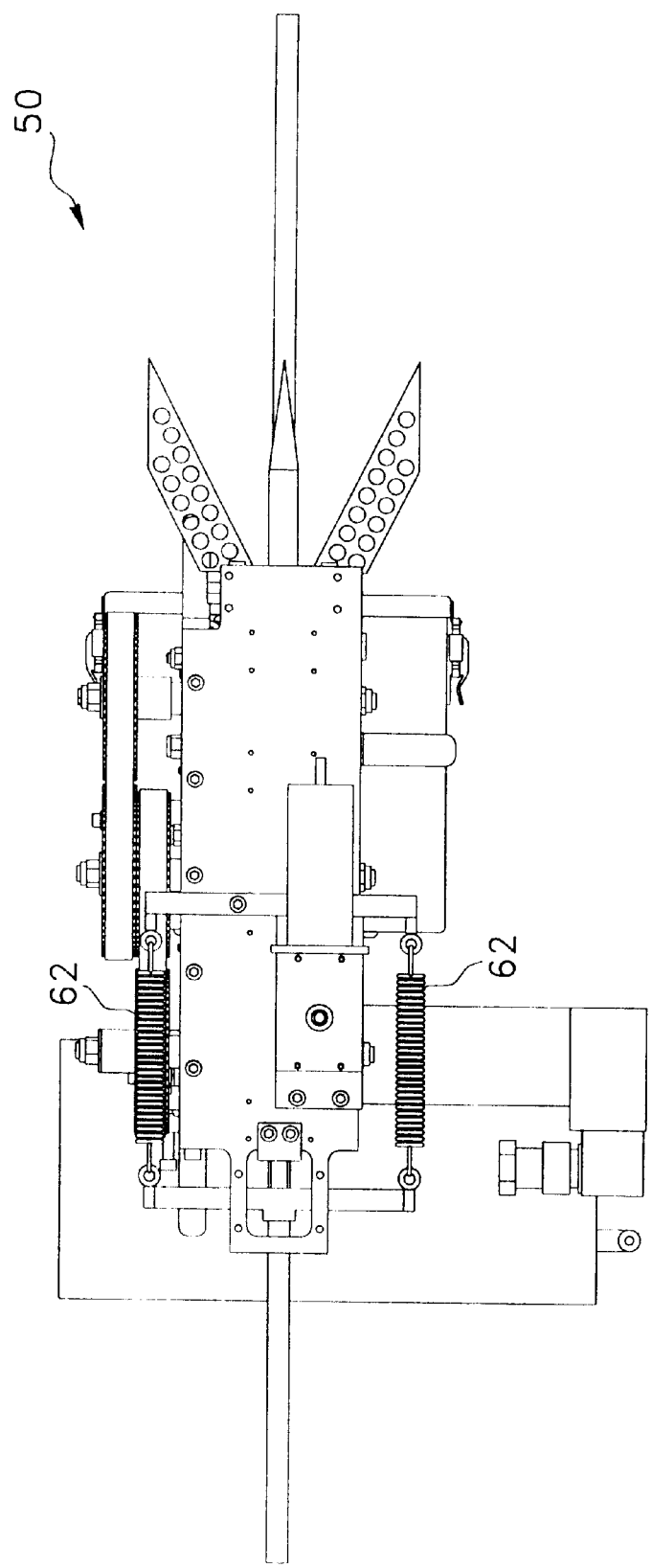
FIG. 11 is a top view of the de-icing tool mounted on the remotely operated vehicle according to the present invention.

Preferably, the de-icing tool 50 can be coupled to a mechanism 58 for giving a back and forth movement to the collar 52 in a direction parallel to the live line 16 (see FIG. 8). This mechanism 58, while in use, allows the blades 54 to break the ice accumulated on the live line 16.

As shown in FIGS. 11 to 14, the collar 52 is mounted at the end of a first rod 66 longitudinally sliding along the vehicle 10. The first rod 66 slides between two supports 68 and is provided with an abutment 82 limiting its longitudinal displacement.

Figure 14:
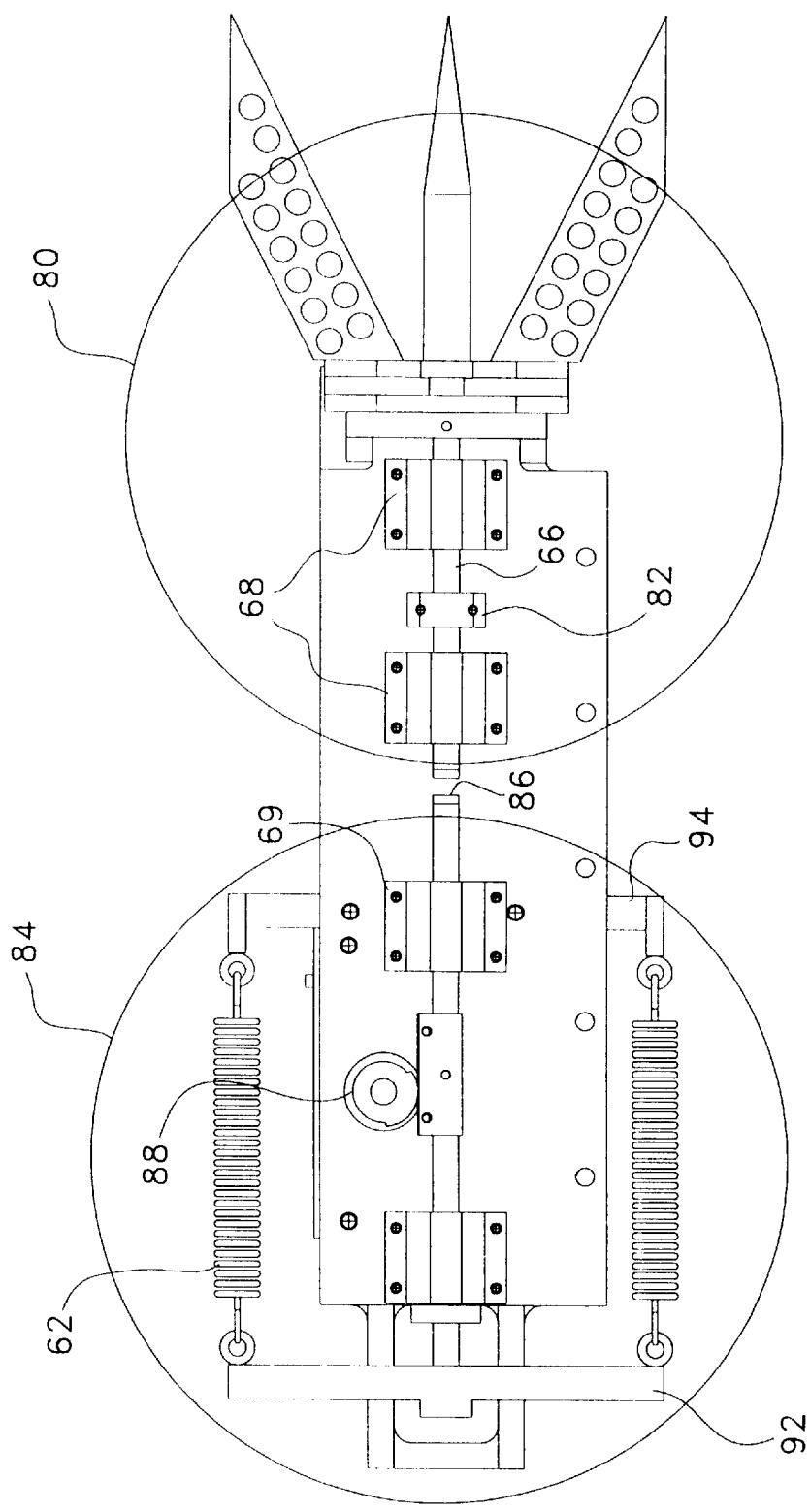
FIG. 14 is a bottom view of the de-icing tool according to the present invention.

As shown in FIG. 14, an impacting system 84 is coupled to a system receiving an impact 80. The impacting system 84 is used to strike the first rod 66. The impacting system 84 has a motor 60 coupled via a camshaft 88 to a second rod 86 sliding longitudinally along the vehicle 10. The second rod 86 slides on supports 69 and is connected to a movable plate 92. The movable plate 92 is connected to springs 62 that accumulate energy when the motor 60 moves the second rod 86.

Figure 12:
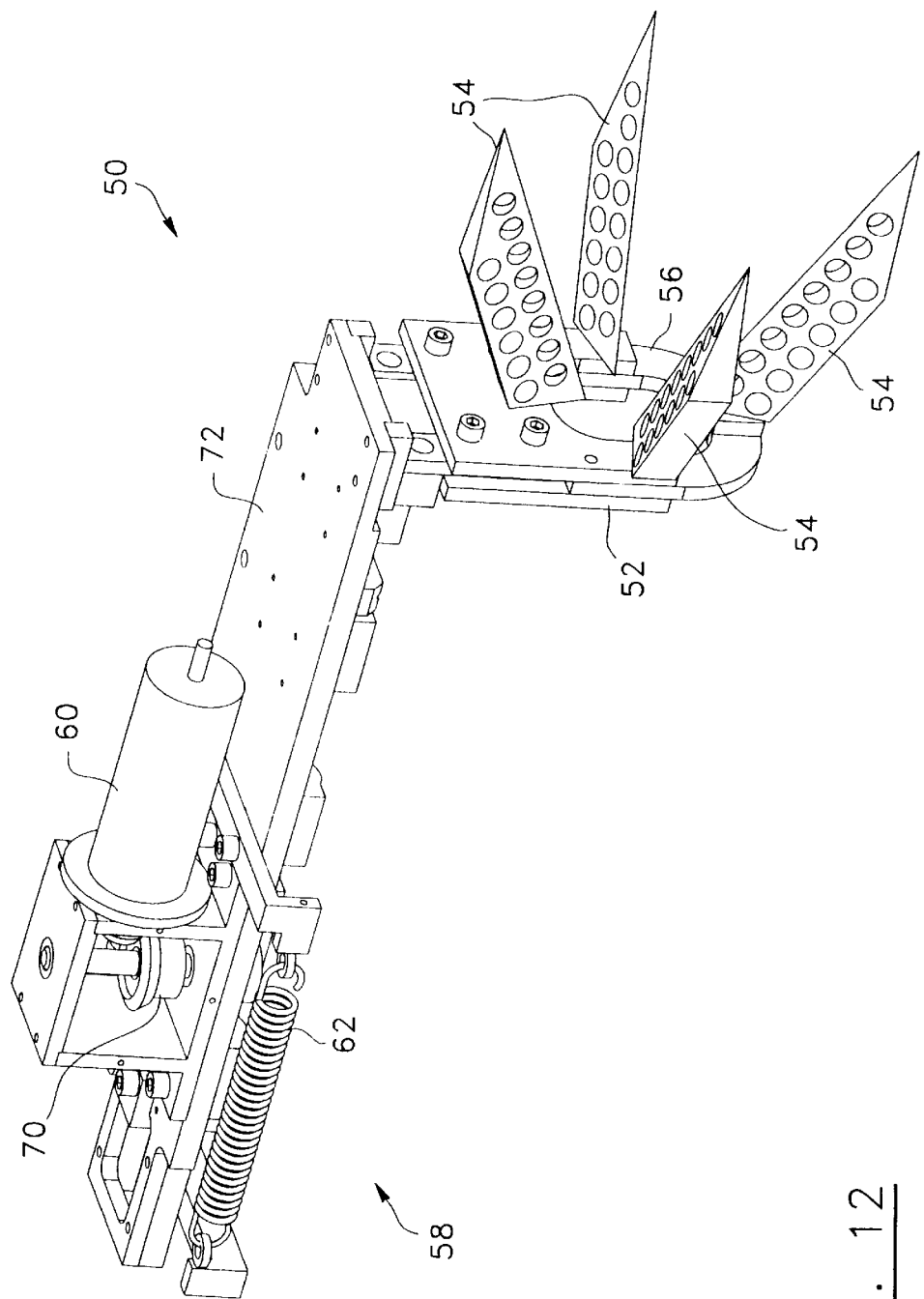
FIG. 12 is a perspective view of the de-icing tool according to the present invention.
Figure 13:
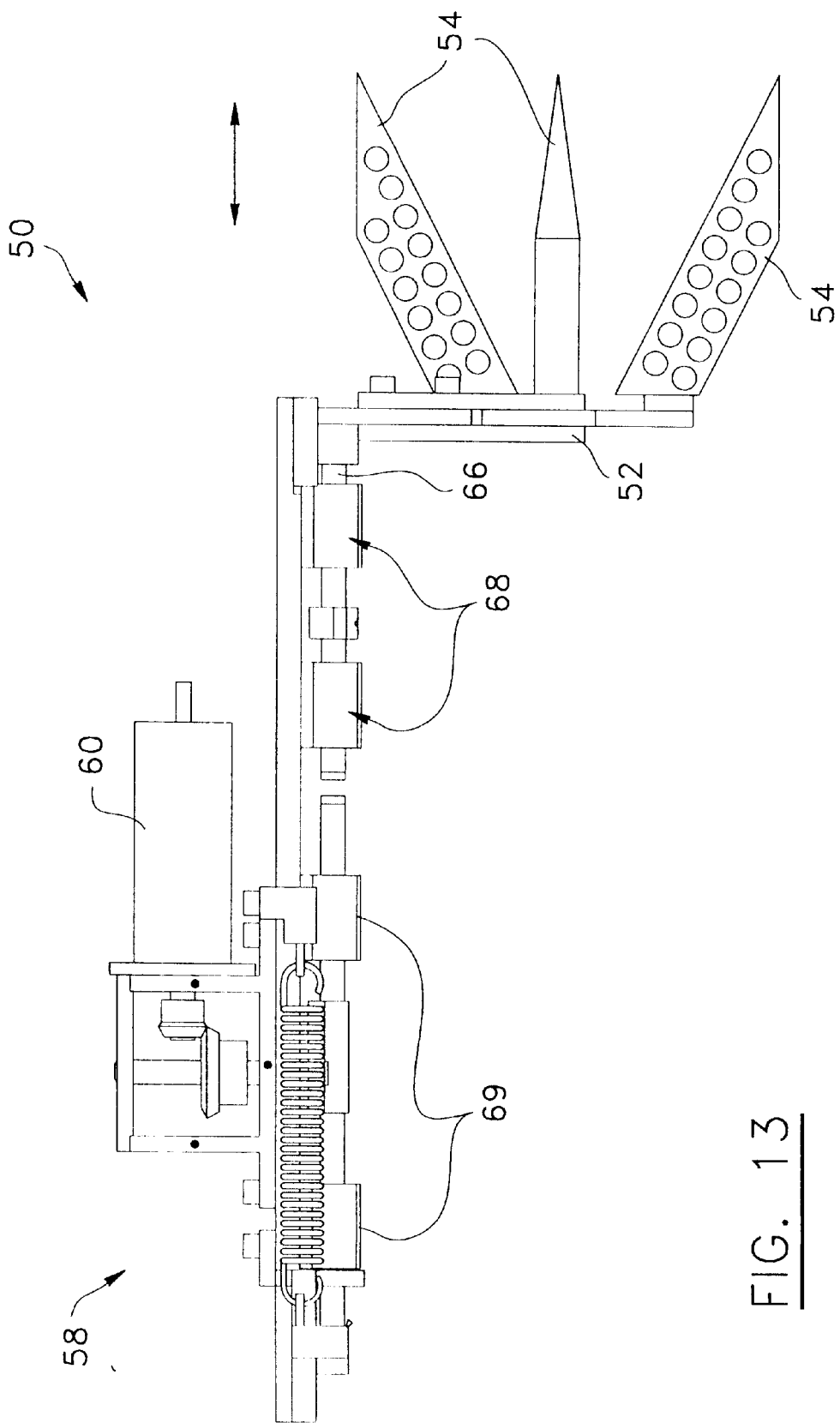
FIG. 13 is a side view of the de-icing tool according to the present invention.

As shown in FIG. 12, the motor 60 is coupled to the camshaft 88 via a gearbox 70. The mechanism 58 is mounted on a support plate 72 that facilitates the installation of the de-icing tool 50 onto the vehicle 10.

In use, the motor 60 moves the second rod 86 backwards, stretching the springs 62. At the end of the camshaft 88, the second rod 86 is released and it strikes the first rod 66. Thereby, the collar 52 is pushed in the forward direction of the vehicle 10. The springs 62 are freed instantaneously allowing the blades 54 to be projected at high speed against the ice. The icy sleeve surrounding the line 16 is shattered and the live line 16 becomes free of ice.

Of course, other mechanisms for pushing the de-icing tool 50 forwardly could be used. For example, a system using hydraulic pistons and cylinders.

The mechanism 58 allows the de-icing tool 50 to improve its performance as it removes ice more easily and quickly.

The present invention is very useful for solving the problem of ice that accumulates on live lines and that can cause great damage thereto or to the pylons supporting them.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

What is claimed is:

1. A vehicle for use on a live line, comprising:
three powered coplanar wheels mounted on a frame and spaced along a first longitudinal axis parallel to the live line and above therefrom;
two movable coplanar pressure wheels mounted on the frame and spaced along a second longitudinal axis parallel to the line and below therefrom;
a driving motor mounted on the frame, for powering each of the powered wheels, the motor having a source of energy;
pressure means mounted on the frame and coupled to the pressure wheels, for maintaining the line squeezed between the powered wheels and the pressure wheels; and control means coupled to the motor for controlling the motor, and thereby in use, the vehicle is moved along the line.

2. The vehicle according to claim 1, wherein each of the pressure wheels is mounted on an arm pivotally connected to the frame, and wherein the pressure means comprises:

a drum pivotally mounted on the frame, the drum rotating between a first blocked position and a second blocked position of the drum;

a lever connected to the drum for manually rotating the drum between the blocked positions;

a pair of cables, each of the cables having portions wound about the drum and pulleys, each of the cables having a first end attached to the drum and a second end attached to the arm of each of the pressure wheels; thereby, in use, in the first blocked position of the drum, the pressure wheels are brought close together with the powered wheels, whereas in the second blocked position of the drum, the pressure wheels are moved away from the powered wheels.

3. The vehicle according to claim 2, further comprising:

a tension spring connected in series on a section of each of the cables; and a return spring connected between the arm of each pressure wheel and the frame.

4. The vehicle according to claim 1, wherein the control means further comprise additional control means for controlling the pressure means.

5. The vehicle according to claim 1, wherein a core of at least one wheel is made of polyurethane.

6. The vehicle according to claim 5, wherein an additive of an abrasive type can be added to the polyurethane.

7. The vehicle according to claim 6, wherein the additive comprises a silicate or a metal type.

8. The vehicle according to claim 1, wherein a core of at least one wheel is made of natural rubber or thermoplastic synthetic rubber.

9. The vehicle according to claim 1, wherein the source of energy of the motor comprises a battery.

10. The vehicle according to claim 9, wherein the battery is of a nickel metal hydride type.

11. The vehicle according to claim 1, wherein the control means comprise a remote control system.

12. The vehicle according to claim 11, wherein the remote control system comprises a wireless radio system.

13. The vehicle according to claim 1, further comprising cleaning, de-icing, maintenance or surveillance systems.

14. A vehicle for use on a live line, comprising:

three coplanar traction wheels mounted on a frame and spaced along a first longitudinal axis parallel to the live line and above therefrom;

two movable coplanar pressure wheels mounted on the frame and spaced along a second longitudinal axis parallel to the line and below therefrom;

a driving motor mounted on the frame, for driving the traction wheels, the motor having a source of energy;

a pressure applicator mounted on the frame and coupled to the pressure wheels, for maintaining the line squeezed between the traction wheels and the pressure wheels;

a controller coupled to the motor for controlling the motor; and thereby in use, the vehicle is moved along the line; and a de-icing tool mounted on the vehicle comprising a collar having two parts opening and closing around the line, the collar supporting blades concentrically spaced apart from each other and forming an open cone in a forward moving direction of the vehicle.

15. The vehicle according to claim 14, wherein at least one of the blades is fixed on a pivoting plate forming an integral part of the collar.

16. The vehicle according to claim 14, wherein the collar comprises three or four blades.

17. The vehicle according to claim 14, further comprising means for moving the collar back and forth in a direction parallel to the line, thereby, in use, breaking ice accumulated on the line.

18. The vehicle according to claim 14, wherein the collar is mounted on a first rod longitudinally sliding along the vehicle, the vehicle further comprising an impacting system for striking the first rod.

19. The vehicle according to claim 18, wherein the impacting system comprises:

a motor coupled via a camshaft to a second rod sliding longitudinally along the vehicle; and a spring coupled to the second rod for storing energy when the motor moves the second rod; and thereby, in use, when the second rod is uncoupled from the motor, the second rod strikes the first rod pushing the collar in a forward direction.

* * * * *